July 6, 1937.  W. F. ERRIG ET AL  2,086,020
SPIRALIZING CONTROL MECHANISM FOR TIRE GROOVERS AND SLOTTERS
Filed Dec. 24, 1935  3 Sheets-Sheet 1
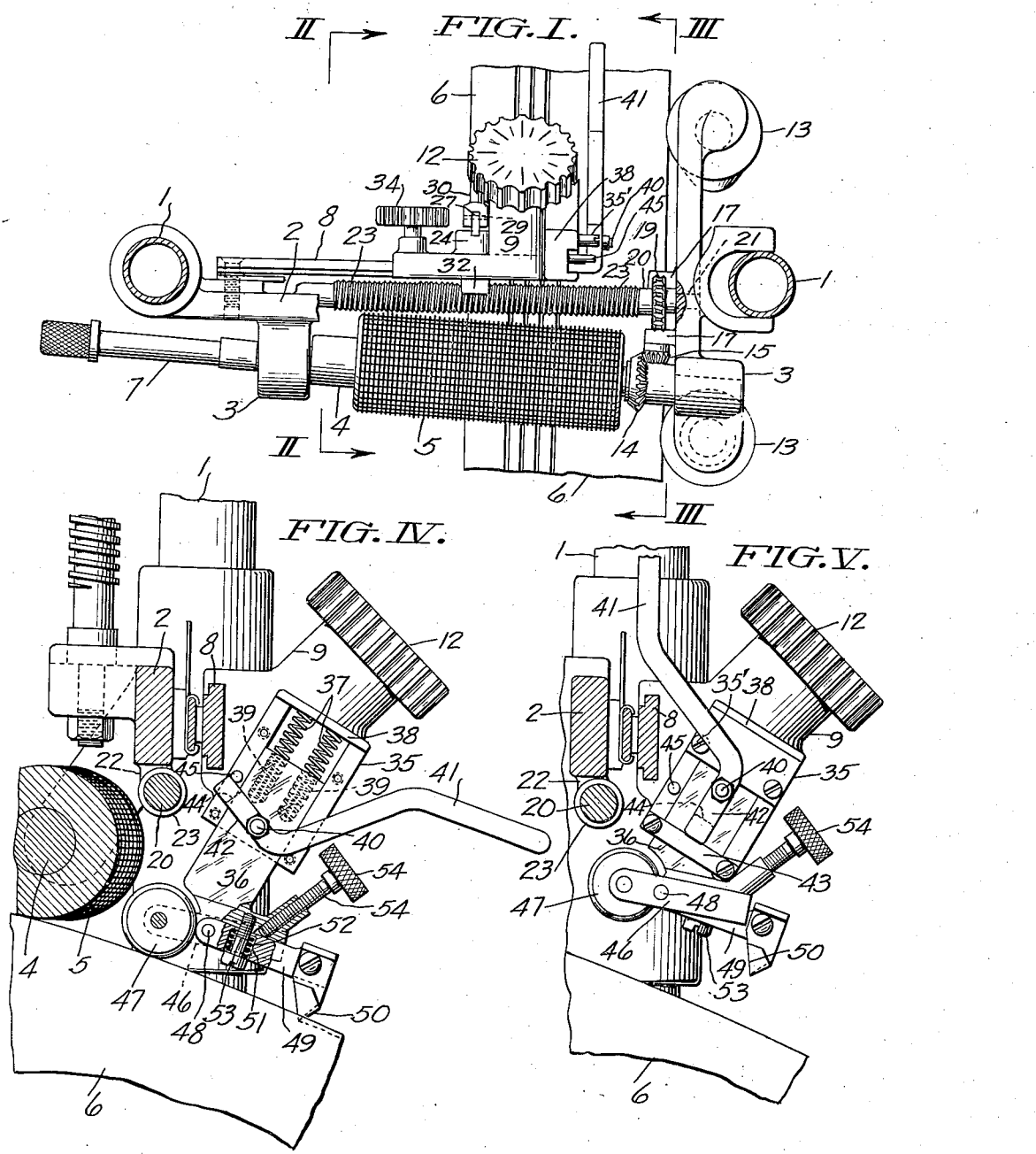
INVENTORS:
William F. Errig &
George M. Pfundt,
BY Alfred J. Bratton
THEIR ATTORNEY July 6, 1937.   W. F. ERRIG ET AL   2,086,020
SPIRALIZING CONTROL MECHANISM FOR TIRE GROOVERS AND SLOTTERS
Filed Dec. 24, 1935   3 Sheets-Sheet 2
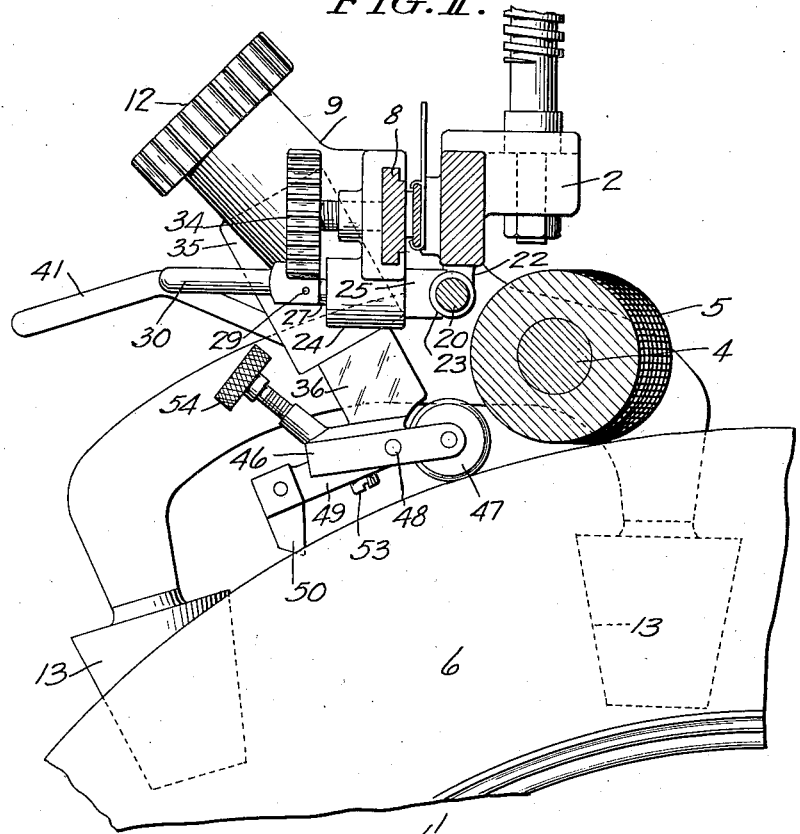
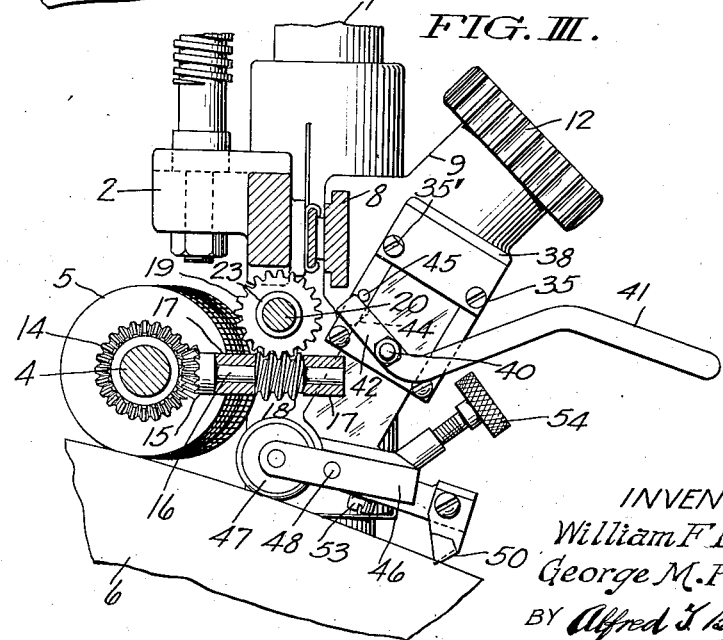
INVENTORS:
William F. Errig &
George M. Pfundt,
BY Alfred T. Bratton
THEIR ATTORNEY.

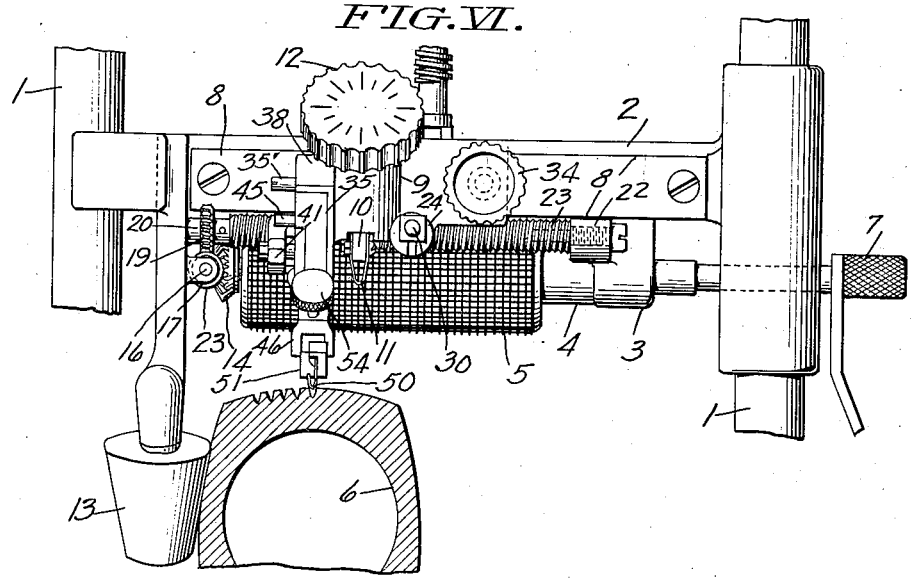
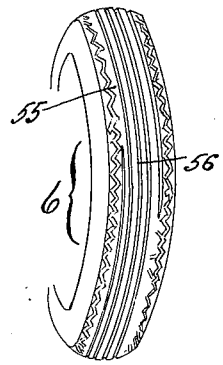
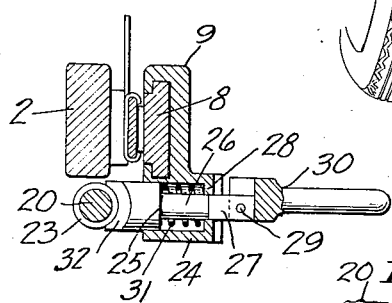
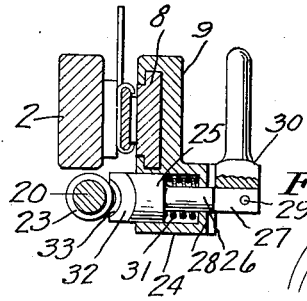
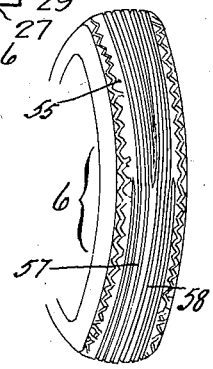
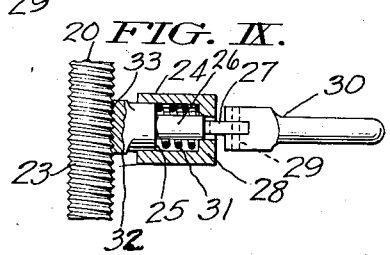

UNITED STATES PATENT OFFICE 2,086,020

SPIRALIZING CONTROL MECHANISM FOR TIRE GROOVERS AND SLOTTERS

William F. Errig, Philadelphia, and George M. Pfundt, Churchville, Pa.

Application December 24, 1935, Serial No. 56,048

13 Claims. (Cl. 82—1)

This invention relates to means for effecting the spiral grooving or slotting of new or worn circumferential surfaces, such as the treads of rubber tires and the like irrespective of whether they be solid, inflated or deflated.

The primary object of this invention is the provision of a simple and effective control-mechanism whereby the circumferential surface or tread of rubber tires and the like can be quickly provided with a continuous spiral groove of substantially even depth around the road contacting portion, irrespective of the arcual or other cross-section of said tires; or with counter-directed spiralized grooves from the center of the tire surface outwardly, and vice versa.

Another object is the provision of a novel type of spiralizing control-mechanism for inclusion in, or application to tire groovers of the types featured in prior U. S. A. Patents No. 1,916,258, dated July 4, 1933, and No. 2,015,635, dated September 4, 1935.

A further object is the provision of a novel form of combined circumferential spiralizing-groover or slotter controlling-mechanism, whereby circumferentially-paralleling or continuous spiral grooves or slots can be cut in new or worn tire surfaces with a minimum of time and labor.

Some of the more pertinent objects of the invention having been stated, others will appear as the following description proceeds when taken in connection with the accompanying illustrative drawings; while the features of novelty are tersely expressed in the claims concluding this specification.

In the drawings:—

Fig. I is a top plan view of a cutter carrier head, in accordance with either of the hereinbefore referred to prior patents, with the novel spiralizing mechanism of this invention applied thereto.

Fig. II is an end elevation looking in the direction of the arrows II—II in Fig. I.

Fig. III is a similar view looking in the direction of the arrows III—III on Fig. I.

Fig. IV is a sectional elevation corresponding substantially to Fig. III but with parts broken away in order to better disclose otherwise hidden features of the spiralizing cutter-carrying means.

Fig. V is a fragmentary view showing the spiralizing cutter-carrying means elevated, or out of action.

Fig. VI is a front elevation, or looking upwardly from below Fig. I.

Fig. VII is a detail sectional view of a trip means controlling the spiralizing operation.

Fig. VIII is a similar view to the preceding but showing the parts in a different position.

Fig. IX is a further corresponding view but with parts removed to better illustrate a feature later on fully set forth.

Fig. X is a perspective view of a conventional rubber tire having a continuous spiralized groove or slot thereabout and as produced by the mechanism of this invention; and Fig. XI is a similar view of a tire with counter-directed spiralized grooves or slots likewise producible by the same mechanism.

In all the views corresponding parts are designated by the same reference numerals.

Referring more particularly to Figs. I–VI inclusive, the numerals 1 indicate fragmentary portions of standards affording guidance for the vertically adjustable carrier 2, including bearings 3 affording journal support for angularly-disposed shaft 4, on which is securely fixed the drive roller 5 for frictional engagement with the tire 6, and whereby the latter is manually or power rotated as desired, by appropriate means applied to the projecting end 7 of the power shaft.

Attached to, or otherwise located in spaced relation to the carrier 2 is a track 8, affording slidable support for a cutter-carrier head 9, fitted with a slide 10 carrying a suitable cutter blade 11, and adjustable by means of a rotative head 12, see Fig. VI, whereby paralleling circumferential grooves can be cut around the tread of the tire 6, in accordance with the disclosure in prior Patent No. 1,916,258; while 13 designates freely rotative coned rollers for coaction with the side of the tire 6; all as and for the purpose set forth in the just mentioned patent, and being merely referred to herein by way of forming a proper background for clear understanding of the instant improvements.

In accordance with the present invention there is suitably secured on the angular shaft 4 adjacent one end of the drive roller 5, a bevel gear 14, in mesh with a small similar gear 15, at one end of a shoot shaft 16, rotatable in spaced bearings 17 integral with or attached to the adjoining side of the carrier 2. This shaft 16 is formed or fitted with a worm 18, intermediate the spaced bearings 17, in mesh with a worm gear 19, suitably secured to the one end of a shaft 20, afforded journal bearing in the carrier 2 at 21 and 22. This shaft 20 is formed or provided with a continuous spiral or thread 23, preferably, of a forty-five degree angle in cross-section for a purpose later on explained.

In order to operatively couple the carrier head 9' with the shaft 20, as well as make provision for automatic "throw-out" of mesh coupler means, there is provided, preferably, therebelow a bearing boss 24 at right angles to the plane of movement of said head. In the boss 24 is fitted a plunger 25, having a stem 26, with a diametral flat extension or tongue 27 for passage through an apertured end closing portion 28 of the boss 24. Pivoted to the tongue 27 at 29 is a clevised trip 30 having a rectangular eccentric connection therewith, while interiorly of the boss 24, intermediate the closing portion 28 and the plunger 25, is a spring 31 in compression; while it is to be particularly remarked that the outer end of the plunger is headed at 32, and spirally grooved or worm-toothed at 33 for coactive engagement with the spiral 23 on the shaft 20, above referred to. Incidentally it is to be remarked that the approximately forty-five degree angularity of the spiral thread 23 and teeth 33 positively ensures snap engagement of the latter with the former without any lateral movement of the cutter carrying head 9. 34 is a clamp-screw for locking the carrier head 9 to track 8 when it is desirable to cut circumferential grooves around the tire, as set forth in prior Patent No. 1,916,258.

Secured to or formed integral with the cutter carrier head 9 is a rectangular housing 35 affording guidance for a slide 36 under the action of outwardly influencing springs 37 intermediate an abutment element 38 and borings 39 in said head. Laterally projecting from the slide 36 is a pin or post 40 on which is loosely pivoted an angled or somewhat Z-shaped lever 41, the portion 42 whereof is adapted to coact with a cross-projection 43 on the housing 35 to effect elevation of the slide 36, in opposition to the springs 37 when a rectangular stop projection 44 on the portion 42 is moved into alignment with the axis of the post 40 with said lever resting against the notched end of a stop screw 35' projecting out from the housing 35, as clearly understandable from Figs. III and V, while a pin 45 on the housing 35 limits downward swinging of the lever 41 when the slide 36 is released, or in operative position, as shown in Fig. IV.

Integral with or attached to the lower end of the slide 36 is a forked shoe 46 affording free rotative bearing for a guide roller 47 adapted to engage the circumferential surface of the tire 6, and intermediate the side flanges of the shoe 46 is pivoted at 48 a blade carrier 49, to the outer end of which is rigidly clamped the cutter blade 50, of appropriate form to cut the desired type of spiral groove or slot. Housed in a recess 51 of the blade carrier 49 is a spring 52 adjustable as to its compressive influence by a screw 53, while a thumb or turn screw 54 in a threaded projection 55 of the shoe 46, coacts with the back of the blade carrier 49, whereby the depth of the groove or slot cut is "set" for depth of cut.

Having explained the structural characteristics of the invention, the operation thereof is briefly as follows:—

Assuming that a tire 6 has been put in the machine, the operator releases the clamp screw 34 and slides the carrier 9 along the track 8 until the cutting blade 50 is in line with the beginning of the tire smooth section, as indicated at 55 in Fig. X, whereupon the lever 41 is released, or snapped downward to place the guide roller 47 in engagement with the tire tread. The turn screw 54 is next manipulated to adjust the depth of the cut while rotating the tire 6, and when the requisite degree of cut is determined, the clevised trip 30 is snapped from the vertical position of Fig. VIII, to the horizontal as indicated in Figs. VII and IX, whereupon the drive roller is rotated, either manually or mechanically by power, with progression of the carrier 9 along the track 8 concurrent rotation of the tire 6, and incidental production of a continuous spiral groove 56 around the tread of the tire 6 from smooth side 55 to smooth side 55', Fig. X, while the springs 37 concurrently follow the cross contour of the tire tread, in an obvious manner. When the groove is completed, the operator simply snaps up the lever or quick release 41 and the tire 6 is removed.

When it is desired to cut or slot a tire with counter-directed spiral grooves, one spiral groove or slot 57 is cut from the smooth section 55 to the center of the tread as indicated on Fig. XI, as above described, when the quick release 41 and trip means 30 respectively are snapped upwardly; whereupon the tire 6 is reversed or turned through an angle of 180°, and the operations above set forth repeated with production of the counter-directed groove or slot 58, Fig. XI.

From the foregoing, it is thought the merits and advantages of this invention will be fully appreciated, while it is to be distinctly understood that parallelly spaced grooves may be easily cut with mechanism described by keeping the worm-headed plunger end 32 retracted from engagement with the spiralized portion 23 of the shaft 20, whereupon said mechanism can be manipulated as set forth in prior Patent No. 1,916,258.

In the drawings and specification, there has been set forth a preferred embodiment of the invention, and although specific terms are employed, they are used in a generic sense only, and not for purposes of limitation, the scope of said invention being defined by the following claims.

Having thus described the invention, we claim:—

1. In a tire groover or slotter, a carrier adapted for support relative to a rotatable tire with a track in spaced relation thereto, a cutter-head on said track, and mechanism whereby the cutter-head is progressable along the track with means whereby the cutting element is caused to follow the tire contour transversely to effect continuous spiral incision of the tire circumferentially.

2. In a tire groover or slotter, a carrier adapted for support above a rotatable tire with a track in spaced relation thereto, a cutter-head on said track, and mechanism including a spiral-drive whereby the cutter-head is progressable along the track and means causing the cutting element to follow the tire tread transversely to effect cutting of a single continuous spiral-groove or slot around said tire tread.

3. In a tire groover or slotter, a carrier adapted for support above a rotatable tire with a track in spaced relation thereto, a cutter-supporting head on said track, mechanism including a spiral-drive to effect progression of the cutter-head along the track with the cutter evenly operating on the tire circumferentially and transversely, and trip means whereby the cutter-head is operatively connected to or disconnected from the spiral-drive.

4. In a tire groover or slotter, a carrier adapted for support above a rotatable tire with a track in spaced relation thereto, a cutter-head on said track, mechanism including a spiral-drive to effect progression of the cutter-head along the track, trip means including a worm-toothed member for operatively connecting the cutter-head to the spiral-drive, and means supporting the grooving or slotting blade with capacity to evenly follow the cross-sectional contour of the tire tread.

5. In a tire groover or slotter, a carrier adapted for support above a rotatable tire with a track in spaced relation thereto, a cutter-head on said track, mechanism including a spiral-drive to effect progression of the cutter-head along the track, trip means including a worm-toothed member for operatively connecting the cutter-head to the spiral-drive, means supporting the cutting blade with capacity to evenly follow the cross-sectional contour of the tire tread, and means whereby the last mentioned means can be held elevated in out-of-action position.

6. In a tire groover or slotter, a carrier adapted for support above a rotatable tire with a track in spaced relation thereto, a cutter-head on said track, mechanism including a spiral-drive to effect progression of the cutter-head along the track, trip means including a worm-toothed member for operatively connecting the cutter-head to the spiral-drive, means supporting the cutting blade with capacity to evenly follow the cross-sectional contour of the tire tread, trip means whereby the last mentioned means can be held in out-of-action position, and means whereby the cutting-blade is adjustable to vary the depth of the groove or slot cut.

7. In a tire circumferential groover or slotter including a member adapted for support above a rotatable tire with a track in spaced relation thereto, a cutter carrier on said track with a suitable blade for producing circumferential grooves or slots around the tire, and a drive roller for rotating said tire, the combination of a bevel gear on the drive roller shaft, a similar gear on a short shaft at right angles to the axis of rotation of the drive roller, said short shaft having a worm thereon in mesh with a worm-wheel on a spirally-threaded shaft suitably journaled on the supporting member aforesaid, and a spring-influenced trip member supported by the cutter carrier and having a worm-toothed end adapted for engagement with the spirally-threaded shaft to effect progression of said cutter carrier, for the purpose specified, and vice versa.

8. The combination of claim 7, wherein the trip member comprises a non-rotative spring-influenced plunger having its outer end formed as a head with worm teeth adapted to the spirally-threaded shaft, said plunger having a diametrically disposed coextensive tongue at the other end guided through a conformative slot to prevent its rotation, and said plunger is actuable by an excentrically-pivoted cam trip at its end remote from the toothed head.

9. In a tire circumferential groover or slotter including a member adapted for support above a rotatable tire with a track in spaced relation thereto, a cutter carrier on said track with a suitable blade for producing circumferential grooves or slots around the tire, and a drive roller for rotating said tire, the combination of a bevel gear on the drive roller shaft, a similar gear on a short shaft at right angles to the axis of rotation of the drive roller, said short shaft having a worm thereon in mesh with a worm-wheel on a spirally-threaded shaft suitably journaled on the supporting member aforesaid, a trip actuable spring-influenced plunger having a worm toothed end for coaction with the spirally-threaded shaft to effect progression of the cutter head along the track, and spring-influenced means supporting a grooving or slotting member in operative coaction with the tire to effect spiral grooving or slotting of the tire tread.

10. In a tire circumferential groover or slotter including a member adapted for support above a rotatable tire with a track in spaced relation thereto, a cutter carrier on said track with a suitable blade for producing circumferential grooves or slots around the tire, and a drive roller for rotating said tire, the combination of a bevel gear on the drive roller shaft, a similar gear on a short shaft at right angles to the axis of rotation of the drive roller, said short shaft having a worm thereon in mesh with a worm-wheel on a spirally-threaded shaft suitably journaled on the supporting member aforesaid, a trip actuable spring-influenced plunger having a worm toothed end for coaction with the spirally-threaded shaft to effect progression of the cutter head along the track, a downwardly-influenced slide sustained by the cutter-carrier with a forked shoe at its lower end, a fulcrumed blade carrier at one end of the shoe with an antifriction guide roller at the other end, and means for holding said slide elevated when the blade carrier is not in use.

11. In a tire circumferential groover or slotter including a member adapted for support above a rotatable tire with a track in spaced relation thereto, a cutter carrier on said track with a suitable blade for producing circumferential grooves or slots around the tire, and a drive roller for rotating said tire, the combination of a bevel gear on the drive roller shaft, a similar gear on a short shaft at right angles to the axis of rotation of the drive roller, said short shaft having a worm thereon in mesh with a worm-wheel on a spirally-threaded shaft suitably journaled on the supporting member aforesaid, a trip actuable spring-influenced plunger having a worm toothed end for coaction with the spirally-threaded shaft to effect progression of the cutter head along the track, a downwardly-influenced slide sustained by the cutter carrier with a forked shoe at its lower end, a fulcrumed blade carrier at one end of the shoe with an antifriction guide roller at the other end, an angled lever sustained by the downwardly-influenced slide for coaction with laterally-projecting movement-limiting stops projecting from the cutter carrier, and means whereby the blade carrier is adjustable to regulate the depth of groove or slot cut.

12. In a tire circumferential groover or slotter including a member adapted for support above a rotatable tire with a track in spaced relation thereto, a cutter carrier on said track with a suitable blade for producing circumferential grooves or slots around the tire, and a drive roller for rotating said tire, the combination of a bevel gear on the drive roller shaft, a similar gear on a short shaft at right angles to the axis of rotation of the drive roller, said short shaft having a worm thereon in mesh with a worm-wheel on a spirally-threaded shaft suitably journaled on the supporting member aforesaid, a trip actuable spring-influenced plunger having a worm toothed end for coaction with the spirally-threaded shaft to effect progression of the cutter head along the track, a downwardly-influenced slide sustained by the cutter carrier with a forked shoe at its lower end, a fulcrumed blade carrier at one end of the shoe with an antifriction guide roller at the other end, an angled lever sustained by the downwardly-influenced slide for coaction with laterally-projecting movement-limiting stops projecting from the cutter carrier, adjustable spring means for regulation of the depth of projection of the blade carrier below the forked shoe, and means whereby the depth of groove or slot cut is adjustable independently of the blade carrier projection controlling means.

13. The combination of claim 7 wherein the spirally-threaded shaft and the worm teeth of the trip means head are both of approximately a forty-five degree cross-section.

WILLIAM F. ERRIG.
GEORGE M. PFUNDT.